(12) United States Patent
Bruno et al.

(10) Patent No.: US 12,054,987 B2
(45) Date of Patent: Aug. 6, 2024

(54) METHOD FOR CONTROLLING THE OPERATION OF A SHADING DEVICE, AND ASSOCIATED SHADING DEVICE

(71) Applicant: SOMFY ACTIVITES SA, Cluses (FR)

(72) Inventors: Serge Bruno, Cluses (FR); David Faure, Cluses (FR); Fabien Rousseau, Cluses (FR); David Mugnier, Cluses (FR); Damien Tine, Cluses (FR); Ben Bosse, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 18/249,672

(22) PCT Filed: Oct. 25, 2021

(86) PCT No.: PCT/EP2021/079574
§ 371 (c)(1),
(2) Date: Apr. 19, 2023

(87) PCT Pub. No.: WO2022/090174
PCT Pub. Date: May 5, 2022

(65) Prior Publication Data
US 2023/0323734 A1    Oct. 12, 2023

(30) Foreign Application Priority Data
Oct. 26, 2020 (FR) ...................................... 2010953

(51) Int. Cl.
*E06B 9/70* (2006.01)
*E06B 9/40* (2006.01)
(Continued)

(52) U.S. Cl.
CPC .................. *E06B 9/70* (2013.01); *E06B 9/40* (2013.01); *E06B 2009/2476* (2013.01); *E06B 2009/6818* (2013.01); *E06B 2009/6872* (2013.01)

(58) Field of Classification Search
CPC ..... E06B 9/40; E06B 9/68; E06B 9/70; E06B 2009/2476; E06B 2009/6818;
(Continued)

(56) References Cited

U.S. PATENT DOCUMENTS

| 5,990,646 A | 11/1999 | Kovach et al. |
| 7,466,090 B2 * | 12/2008 | Meewis .................. E06B 9/322 160/84.02 |

(Continued)

FOREIGN PATENT DOCUMENTS

| FR | 2 894 278 A1 | 6/2007 |
| FR | 3 093 124 A1 | 8/2020 |
| JP | H08-28162 A | 1/1996 |

OTHER PUBLICATIONS

International Search Report for PCT/EP2021/079574 mailed Jan. 14, 2022, 4 pages.
(Continued)

*Primary Examiner* — Abe Massad
(74) *Attorney, Agent, or Firm* — NIXON & VANDERHYE

(57) ABSTRACT

A method for controlling a shading device includes: moving a screen by electrical activation of an electromechanical actuator; determining a value of data representing operation of a motorised drive device during screen movement; and comparing the determined data to a first predetermined threshold. Depending on the result, the method includes: reducing a rotational speed setpoint of an output shaft of the electromechanical actuator if the value of the determined data≥the value of the first predetermined threshold, to reduce (Continued)

power consumed by the electromechanical actuator; or maintaining the rotational speed setpoint of the output shaft of the electromechanical actuator as long as the determined data<the value of the first predetermined threshold. The determined data is the power consumed or the torque delivered by the electromechanical actuator. The determining, comparing, and reducing are iterated until a value of a second predetermined speed threshold is reached.

20 Claims, 4 Drawing Sheets

(51) Int. Cl.
*E06B 9/24* (2006.01)
*E06B 9/68* (2006.01)

(58) Field of Classification Search
CPC ..... E06B 2009/6872; E06B 2009/6845; E06B 2009/6809; E06B 2009/6854; E06B 9/42; E06B 9/72
See application file for complete search history.

(56) References Cited

U.S. PATENT DOCUMENTS

| | | | | |
|---|---|---|---|---|
| 10,358,869 | B2* | 7/2019 | Feldstein | E06B 9/68 |
| 10,822,869 | B2* | 11/2020 | Hall | E06B 9/303 |
| 10,920,491 | B2* | 2/2021 | Feldstein | E06B 9/68 |
| 11,703,813 | B2* | 7/2023 | Rebbert | G05B 11/01 |
| | | | | 318/565 |
| 2015/0159433 | A1 | 6/2015 | Adams et al. | |
| 2015/0226001 | A1* | 8/2015 | Adams | E06B 9/72 |
| | | | | 160/84.02 |
| 2015/0330139 | A1 | 11/2015 | Baczuk | |
| 2019/0045961 | A1* | 2/2019 | Pham | E06B 9/78 |
| 2023/0193691 | A1* | 6/2023 | Burlew | G05B 15/02 |
| | | | | 160/310 |

OTHER PUBLICATIONS

Written Opinion of the ISA for PCT/EP2021/079574 mailed Jan. 14, 2022, 8 pages.
Written Opinion for FR2010953 dated Oct. 26, 2020, 5 pages.

* cited by examiner

METHOD FOR CONTROLLING THE OPERATION OF A SHADING DEVICE, AND ASSOCIATED SHADING DEVICE

CROSS-REFERENCE TO RELATED APPLICATIONS

This application is the U.S. national phase of International Application No. PCT/EP2021/079574 filed Oct. 25, 2021, which designated the U.S. and claims priority to FR 2010953 filed Oct. 26, 2020, the entire contents of each of which are hereby incorporated by reference.

The present invention relates to a method for controlling the operation of a shading device.

The present invention also relates to a shading device adapted to implement this control method.

In general, the present invention relates to the field of shading devices comprising a motorised drive device moving a screen, between at least one first position and at least one second position.

A motorised drive device comprises an electromechanical actuator of a movable closure, shading or solar protection element, such as a shutter, a blind, a door, a gate, a curtain or any other equivalent equipment, hereinafter referred to as screen.

JPH 08 281 62 A is already known, describing a method for controlling the operation of a shading device. The shading device comprises a screen and a motorised drive device. The motorised drive device comprises an electromechanical actuator, an electronic control unit and an electrical energy supply device. The electromechanical actuator is configured to move the screen, between a first end-of-travel position and a second end-of-travel position. The electromechanical actuator comprises an electric motor and an output shaft.

The method comprises a step of executing a movement of the screen by electrical activation of the electromechanical actuator. The movement of the screen is initially executed at a nominal rotational speed setpoint of the output shaft of the electromechanical actuator.

However, this shading device has the disadvantage that the electrical energy supply device is formed by a mains electrical energy supply network. The electronic control unit and the electrical motor are supplied with electrical energy by means of the mains electrical energy supply network.

Furthermore, this method has the feature of determining a value of an output voltage of a battery of an obstacle detection device or a control point, comparing this value of the output voltage, determined during the step of determining, with respect to a value of a predetermined threshold, then depending on the result, obtained during the step of comparing, reducing the rotational speed setpoint of the output shaft of the electromechanical actuator if the value of the output voltage, determined during the step of determining, is less than the value of the predetermined threshold.

Thus, this method allows to inform the user that the output voltage of the battery of the obstacle detection device or the control point is below the value of the predetermined threshold and that the battery needs to be replaced.

Therefore, this method is not intended to adapt the rotational speed of the output shaft of the electromechanical actuator on the basis of data representative of the operation of the motorised drive device during movement of the screen.

This method does not thus prevent a given power from being exceeded for each of the energy storage elements of a battery intended to supply electrical energy to the electric motor of the electromechanical actuator and the electronic control unit of the motorised drive device.

US 2015/0159433 A1 is also known, describing a method for controlling the operation of a shading device. The shading device comprises a screen and a motorised drive device. The motorised drive device comprises an electromechanical actuator, an electronic control unit and an electrical energy supply device. The electromechanical actuator is configured to move the screen, between a first end-of-travel position and a second end-of-travel position, and vice versa. The electromechanical actuator comprises an electric motor. The motorised drive device comprises two output shafts. The electrical energy supply device comprises a battery. The battery comprises a plurality of energy storage elements. The electronic control unit and the electric motor are supplied with electrical energy by means of the battery. The electronic control unit comprises a measuring device. The measuring device is configured to measure an input voltage of the battery. The method comprises a step of executing a movement of the screen by electrical activation of the electromechanical actuator, a step of determining a value of an amplitude of battery voltage, by means of the measuring device, during the movement of the screen, during the step of executing, a step of comparing the value of the amplitude of the battery voltage, determined during the step of determining, with respect to a value of a single predetermined threshold. If the value of the amplitude of the battery voltage, determined during the step of determining, is lower than the value of the single predetermined threshold, the method implements a step of reducing the rotational speed setpoint of the output shaft of the electromechanical actuator.

Also known are documents FR 2 894 278 A1 and FR 3 093 124 A1 which respectively describe a shading device. The shading device comprises a screen and a motorised drive device. The motorised drive device comprises an electromechanical actuator, an electronic control unit and an electrical energy supply device. The electromechanical actuator is configured to move the screen, between a first end-of-travel position and a second end-of-travel position, and vice versa. The electromechanical actuator comprises an electric motor. The electrical energy supply device comprises a battery. The battery comprises a plurality of energy storage elements. The electronic control unit and the electric motor are supplied with electrical energy by means of the battery. The screen can be moved by electrical activation of the electromechanical actuator.

However, this document is silent as to adapting the rotational speed of an output shaft of the electromechanical actuator on the basis of data representative of the operation of the motorised drive device during movement of the screen.

The present invention aims to solve the above-mentioned drawbacks and to provide a method for controlling the operation of a shading device, as well as a shading device, which prevents a given power from being exceeded for each of the energy storage elements of a battery intended for supplying electrical energy to an electric motor of an electromechanical actuator and an electronic control unit of a motorised drive device.

To this end, the present invention relates, according to a first aspect, to a method for controlling the operation of a shading device, the shading device comprising at least:
  a screen, and
  a motorised drive device,
the motorised drive device comprising at least:

an electromechanical actuator, the electromechanical actuator being configured to move the screen, between a first end-of-travel position and a second end-of-travel position, and vice versa, an electronic control unit, and an electrical energy supply device, the electromechanical actuator comprising at least:

an electric motor, and an output shaft, the electrical energy supply device comprises at least:

a battery, the battery comprising a plurality of energy storage elements, the electronic control unit and the electric motor being supplied with electrical energy by means of the battery, the electronic control unit comprising at least:

a measuring device, the measuring device being configured to measure a quantity representative of the operation of the motorised drive device.

The method comprises at least the following steps:

executing a movement of the screen by electrical activation of the electromechanical actuator, determining at least one value of data, by means of the measuring device, representative of the operation of a motorised drive device during the movement of the screen, during the step of executing, the data being the power consumed by the electromechanical actuator or the torque delivered by the electromechanical actuator during the movement of the screen, during the step of executing, comparing the value of data, determined during the step of determining, with respect to at least one value of a first predetermined threshold, depending on the result, obtained during the step of comparing, reducing the rotational speed setpoint of the output shaft of the electromechanical actuator if the value of data, determined during the step of determining, is equal to or exceeds the value of the first predetermined threshold, so as to reduce an electric power consumed by the electromechanical actuator from the battery, or maintaining the rotational speed setpoint of the output shaft of the electromechanical actuator as long as the value of data, determined during the step of determining, is lower than the value of the first predetermined threshold.

The step of determining, the step of comparing and the step of reducing the rotational speed setpoint of the output shaft of the electromechanical actuator are implemented iteratively until a value of a second predetermined threshold is reached. Furthermore, the value of the second predetermined threshold is a value of a predetermined speed threshold.

Thus, the method allows the electromechanical actuator to be optimally controlled depending on the speed of the output shaft, without exceeding a given power for each of the energy storage elements of the battery intended to supply electrical energy to the electric motor of the electromechanical actuator and the electronic control unit of the motorised drive device.

In this way, the method allows to ensure a long life of the battery, to optimise sizing of the battery and, more particularly, to optimise the number and the energy storage capacity of the energy storage elements of the battery.

Furthermore, such a method can allow to minimise the noise of the motorised drive device and, more particularly, of the shading device during electrical activation of the electromechanical actuator.

Moreover, such a method allows to adapt automatically the operation of the electromechanical actuator according to data representative of the operation of the motorised drive device during the movement of the screen and, more particularly, its power consumed.

The method can thus allow to eliminate the need to learn, during one or more previous movements of the screen, the variation of data representative of the operation of the motorised drive device. This avoids the need to determine a specific rotational speed setpoint of the output shaft of the electromechanical actuator, that specific setpoint being different from a nominal rotational speed setpoint, at least during a start-up phase of the electromechanical actuator.

According to an advantageous feature of the invention, the step of determining, the step of comparing and the step of reducing or the step of maintaining are implemented iteratively according to a predetermined time period.

According to another advantageous feature of the invention, following the step of reducing, if the value of data, determined during the step of determining, is lower than the value of the first predetermined threshold, the rotational speed setpoint of the output shaft of the electromechanical actuator is maintained at the value of the second predetermined threshold.

In a variant, upon reaching the second value of the predetermined speed threshold, the method implements a step of increasing the rotational speed setpoint of the output shaft of the electromechanical actuator.

In a variant, in the case where data, determined during the step of determining, is equal to or exceeds the value of the first predetermined threshold, during a movement of the screen, implemented during the step of executing, the method implements a step of modifying the rotational speed setpoint of the output shaft of the electromechanical actuator, so as to adapt the value of the rotational speed setpoint of the output shaft of the electromechanical actuator during a subsequent movement of the screen, implemented during a new step of executing.

According to another advantageous feature of the invention, the method further comprises a step of selecting the value of the first predetermined threshold from a plurality of values, depending on at least one condition.

According to another advantageous feature of the invention, the method is implemented in the case of executing an upward movement of the screen.

The present invention relates, according to a second aspect, to a shading device, the shading device comprising at least:

a screen, and a motorised drive device, the motorised drive device comprising at least:

an electromechanical actuator, the electromechanical actuator being configured to move the screen, between a first end-of-travel position and a second end-of-travel position, and vice versa, an electronic control unit, and an electrical energy supply device, the electromechanical actuator comprising at least:

an electric motor, and an output shaft, the electrical energy supply device comprising at least:

a battery, the battery comprising a plurality of energy storage elements, the electronic control unit and the electric motor being supplied with electrical energy by means of the battery.

The electronic control unit is configured to implement the method according to the invention and as mentioned above.

This shading device has similar features and advantages to those described above, in relation to the method for controlling the operation of a shading device according to the invention.

Further features and advantages of the invention will become apparent from the following description, made with reference to the attached drawings, which are given as non-limiting examples:

Figure 1:
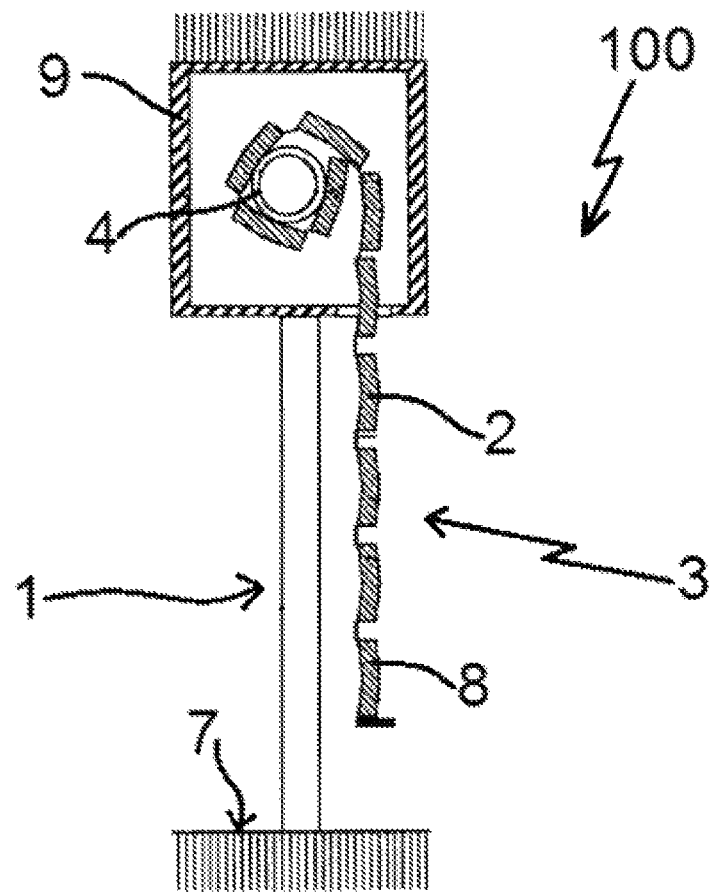
FIG. 1 is a schematic transverse cross-section view of an installation comprising a shading device according to the invention.
Figure 2:
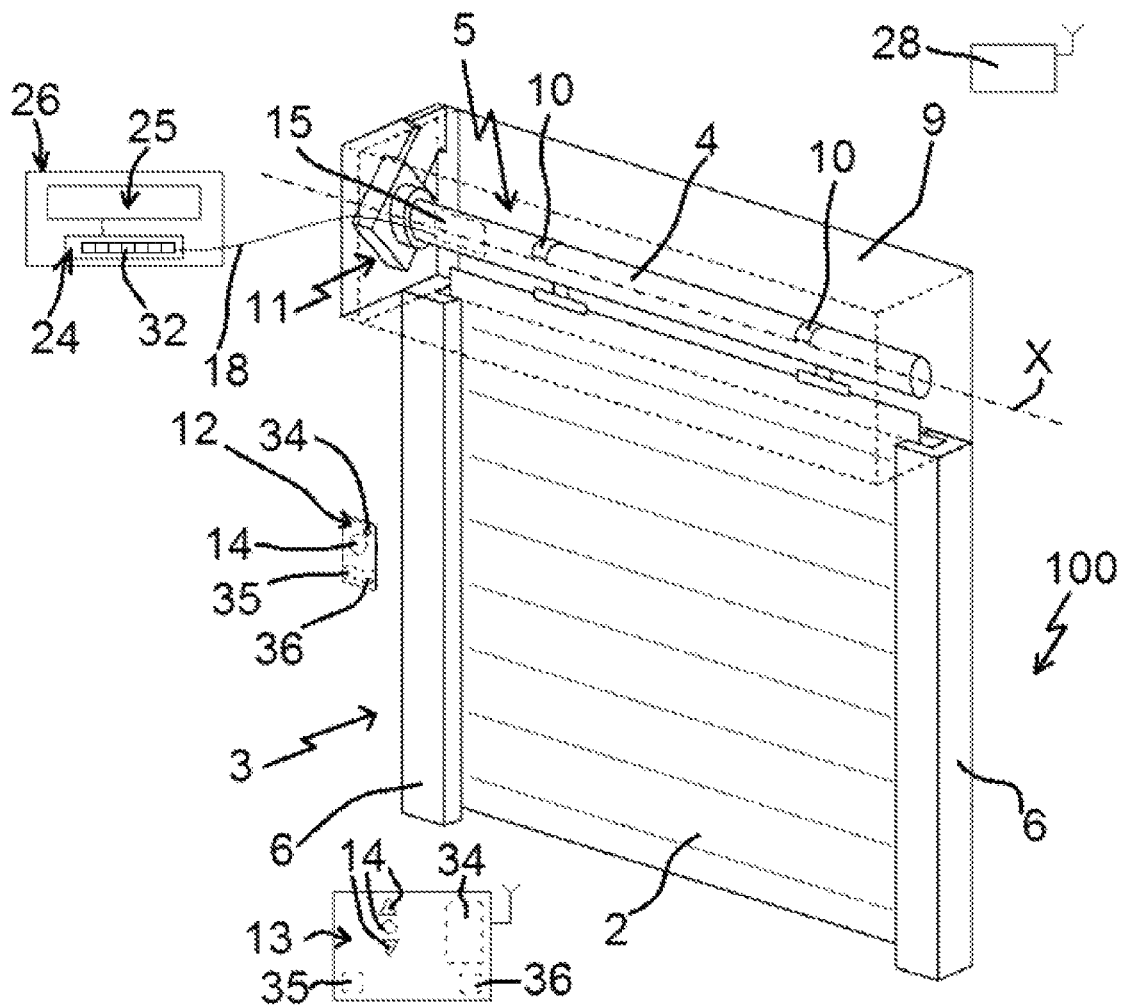
FIG. 2 is a schematic perspective view of the installation illustrated in FIG. 1.
Figure 3:
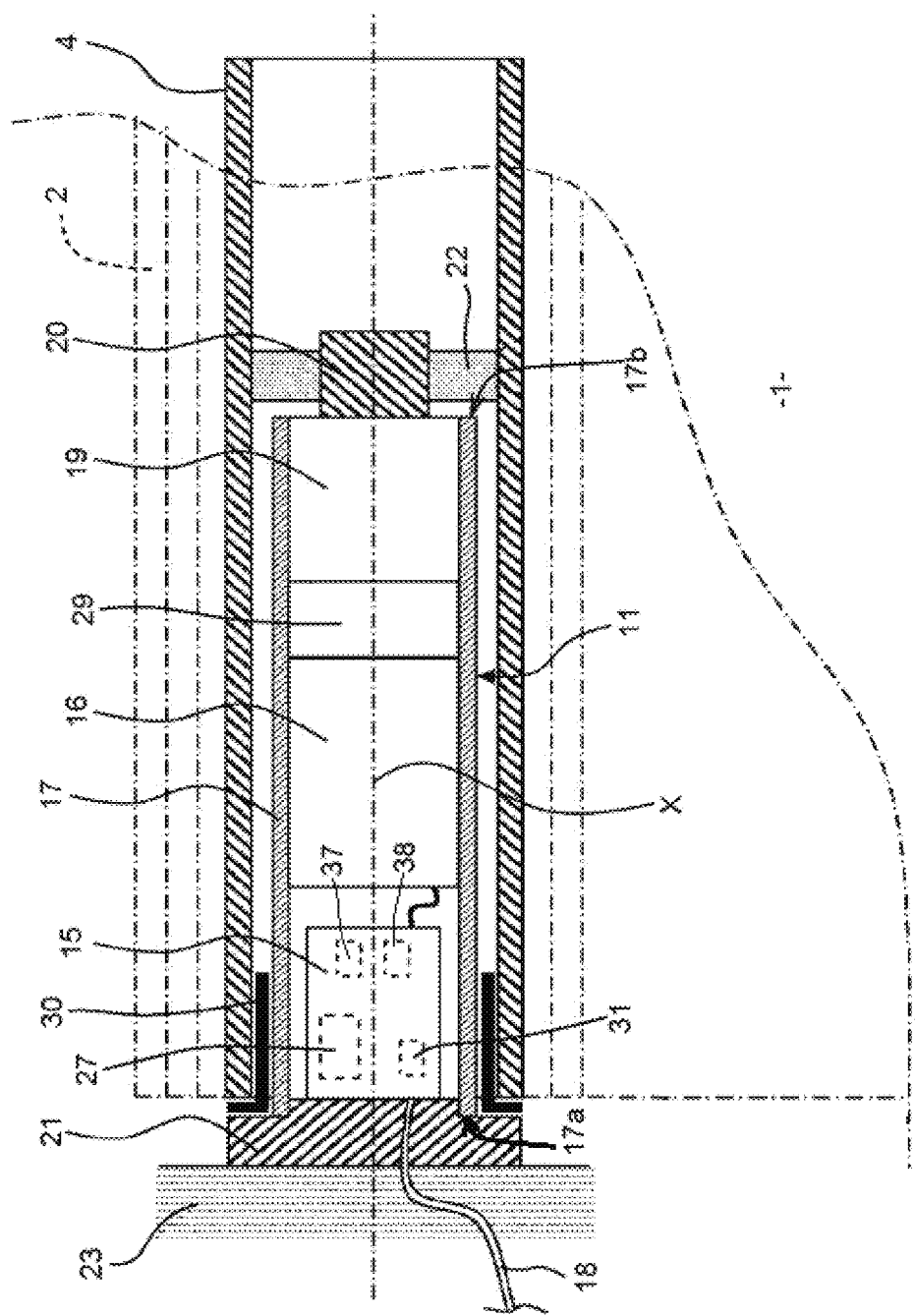
Figure 4:
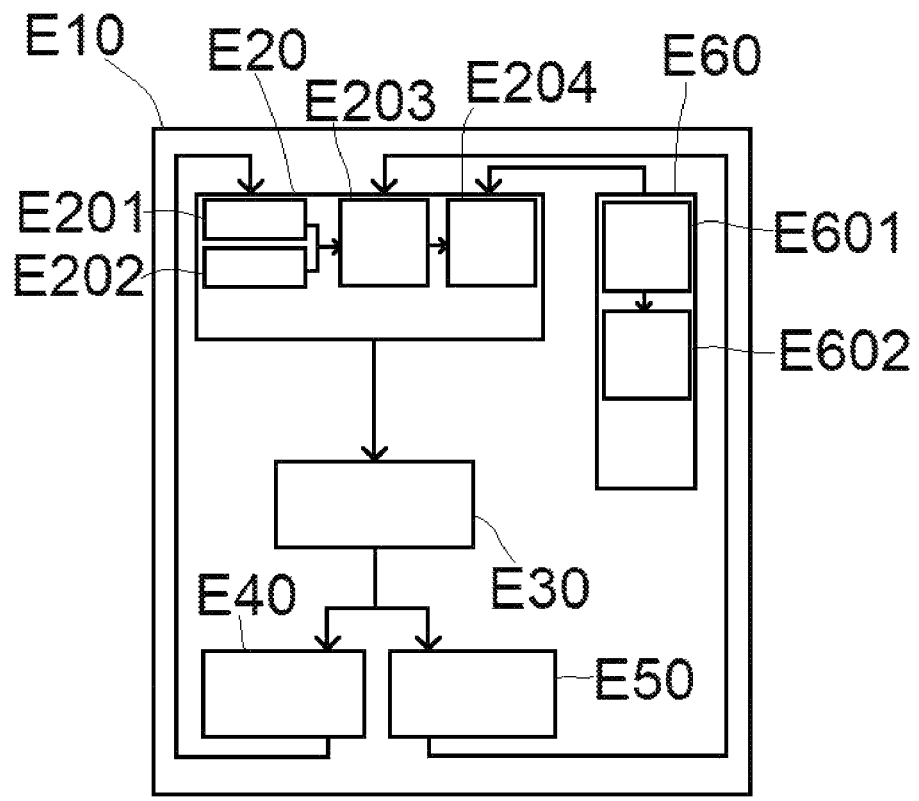

FIG. 3 is a schematic cross-section view of an electromechanical actuator of the installation illustrated in FIGS. 1 and 2, along a sectional plane passing through an axis of rotation of an output shaft of the electromechanical actuator; and FIG. 4 is a block diagram of an algorithm of a method according to the invention, for controlling the operation of the shading device illustrated in FIGS. 1 to 3.

Firstly, with reference to FIGS. 1 and 2, an installation 100, comprising a closing, shading or solar protection device 3 according to the invention, installed in a building comprising an opening 1, a window or a door, is described. This installation 100 is equipped with a screen 2 belonging to the closing, shading or solar protection device 3, in particular a motorised roller shutter.

The closing, shading or solar protection device 3 is hereinafter referred to as "shading device". The shading device 3 comprises the screen 2.

The shading device 3 can be a roller shutter, a fabric blind, a blind with adjustable slats, a roller gate, a gate, a door or a swinging shutter. The present invention is applicable to all types of shading devices.

Here, the installation 100 comprises the shading device 3.

With reference to FIGS. 1 and 3, a roller shutter according to the invention is described.

The shading device 3 comprises a motorised drive device 5. The motorised drive device 5 comprises an electromechanical actuator 11 illustrated in FIG. 3.

Advantageously, the shading device 3 further comprises a winding tube 4. The screen 2 can be rolled onto the winding tube 4. Furthermore, the winding tube 4 is arranged to be rotated by the electromechanical actuator 11.

Thus, the screen 2 of the shading device 3 is rolled onto the winding tube 4 or unrolled around it, the winding tube 4 being driven by the motorised drive device 5, in particular by the electromechanical actuator 11.

In this way, the screen 2 is movable between a rolled position, in particular a high position, and an unrolled position, in particular a low position, and vice-versa.

The screen 2 of the shading device 3 is a closing, shading and/or solar protection screen, which can be wound and unwound around the winding tube 4, the inner diameter of which is greater than the outer diameter of the electromechanical actuator 11, so that the electromechanical actuator 11 can be inserted into the winding tube 4, when the shading device 3 is assembled.

The electromechanical actuator 11, in particular of tubular type, allows the winding tube 4 to be rotated around an axis of rotation X, so that the screen 2 of the shading device 3 can be moved, in particular unrolled or rolled.

In a mounted state of the shading device 3, the electromechanical actuator 11 is inserted into the winding tube 4.

In a known way, the roller shutter, which forms the shading device 3, comprises a curtain comprising horizontal slats articulated to each other, forming the screen 2 of the roller shutter 3, and guided by two lateral slides 6. These slats are joined together when the curtain 2 of the roller shutter 3 reaches its lower unrolled position.

In the case of a roller shutter, the upper rolled position corresponds to a final end slat 8, for example in the shape of an L, of the curtain 2 of the roller shutter 3 coming to rest against an edge of a box 9 of the roller shutter 3 or to the final end slat 8 being stopped in a programmed top end-of-travel position. Furthermore, the lower unrolled position corresponds to the final end slat 8 of the curtain 2 of the roller shutter 3 coming to rest against a threshold 7 of the opening 1 or to the final end slat 8 being stopped in a programmed lower end-of-travel position.

Here, the screen 2 is configured to be moved, by means of the motorised drive device 5, between an open position, corresponding to the rolled-up position and which can also be called first end-of-travel position or high end-of-travel position FdcH, and a closed position, corresponding to the unrolled position and which can also be called second end-of-travel position or low end-of-travel position FdcB.

Thus, the electromechanical actuator 11 is configured to drive, in other words drives, the screen 2, between the first end-of-travel position FdCH and the second end-of-travel position FdCB.

The first slat of the roller shutter 3, opposite the final end slat 8, is connected to the winding tube 4 by means of at least one joint 10, in particular a strip-shaped attachment piece.

The winding tube 4 is located inside the box 9 of the roller shutter 3. The curtain 2 of the roller shutter 3 rolls and unrolls around the winding tube 4 and is housed at least partly inside the box 9.

Generally, the box 9 is arranged above the opening 1, or at the upper part of the opening 1.

Advantageously, the motorised drive device 5 is controlled by a command unit. The command unit can be, for example, a local command unit 12 or a central command unit 13.

Advantageously, the local command unit 12 can be connected to the central command unit 13, via a wired or wireless connection.

Advantageously, the central command unit 13 can control the local command unit 12, and other similar local command units distributed throughout the building.

The motorised drive device 5 is, preferably, configured to execute the commands for unrolling or rolling the screen 2 of the shading device 3, which can be emitted, especially, by the local command unit 12 or the central command unit 13.

The installation 6 comprises the local command unit 12, the central command unit 13, or both the local command unit 12 and the central command unit 13.

The electromechanical actuator 11 belonging to the installation 100 of FIGS. 1 and 2 is now described in more detail with reference to FIG. 3.

The electromechanical actuator 11 comprises an electric motor 16. The electric motor 16 comprises a rotor and a stator, not shown, positioned coaxially around the axis of rotation X of the winding tube 4 in the mounted configuration of the motorised drive device 5.

Here, the electric motor 16 is of the electronically commutated brushless type, also known as "BLDC" (BrushLess Direct Current) or "permanent magnet synchronous".

Means for controlling the electromechanical actuator 11, allowing the movement of the screen 2 of the shading device 3, comprise at least an electronic control unit 15. This electronic control unit 15 is able to turn on the electric motor 16 of the electromechanical actuator 11 and, in particular, to enable the supply of electrical energy to the electric motor 16.

Thus, the electronic control unit 15 controls, especially, the electric motor 16, so as to open or close the screen 2, as described previously.

The means of controlling the electromechanical actuator 11 comprise hardware and/or software means.

As a non-limiting example, the hardware means can comprise at least a microcontroller 31.

Advantageously, the electronic control unit 15 further comprises a first communication module 27, in particular for receiving command orders, the command orders being emitted by a command order emitter, such as the local command unit 12 or the central command unit 13, these command orders being intended to control the motorised drive device 5.

Advantageously, the first communication module 27 of the electronic control unit 15 is wireless. In particular, the first communication module 27 is configured to receive radio command orders.

Advantageously, the first communication module 27 can also allow the reception of command orders transmitted by wired means.

Advantageously, the electronic control unit 15, the local command unit 12 and/or the central command unit 13 can be in communication with a weather station located inside the building or remote outside the building, including, especially, one or more sensors that can be configured to determine, for example, temperature, brightness, or wind speed, in the case where the weather station is placed outside the building.

Advantageously, the electronic control unit 15, the local command unit 12, and/or the central command unit 13 can also be in communication with a server 28, as illustrated in FIG. 2, so as to control the electromechanical actuator 11 according to data made available remotely via a communication network, in particular an Internet network that can be connected to the server 28.

The electronic control unit 15 can be controlled from the local command unit 12 and/or central command unit 13. The local command unit 12 and/or central command unit 13 is provided with a control keyboard. The control keyboard of the local command unit 12 or central command unit 13 comprises one or more selection elements 14 and, eventually, one or more display elements 34.

By way of non-limiting examples, the selection elements can include push buttons and/or touch-sensitive keys. The display elements can comprise light emitting diodes and/or an LCD (Liquid Crystal Display) or TFT (Thin Film Transistor) display. The selection and display elements can also be realised by means of a touch screen.

The local command unit 12 and/or central command unit 13 comprises at least a second communication module 36.

Thus, the second communication module 36 of the local command unit 12 or central command unit 13 is configured to emit, in other words emits, command orders, in particular by wireless means, for example radio, or by wired means.

Furthermore, the second communication module 36 of the local command unit 12 or central command unit 13 can also be configured to receive, in other words receives, command orders, in particular via the same means.

The second communication module 36 of the local command unit 12 or central command unit 13 is configured to communicate, in other words communicates, with the first communication module 27 of the electronic control unit 15.

Thus, the second communication module 36 of the local command unit 12 or central command unit 13 exchanges command orders with the first communication module 27 of the electronic control unit 15, either monodirectionally or bidirectionally.

Advantageously, the local command unit 12 is a control point, which can be fixed or mobile. A fixed control point can be a control box to be fixed on a façade of the wall of the building or on a face of a frame of a window or a door. A mobile control point can be a remote control, a smartphone or a tablet.

Advantageously, the local command unit 12 and/or central command unit 13 further comprises a controller 35.

The motorised drive device 5, in particular the electronic control unit 15, is, preferably, configured to carry out command orders of the movement, in particular closing and opening, of the screen 2 of the shading device 3. These command orders can be emitted, especially, by the local command unit 12 or by the central command unit 13.

The motorised drive device 5 can be controlled by the user, for example by receiving a command order corresponding to pressing the or one of the selection elements 14 of the local command unit 12 or central command unit 13.

The motorised drive device 5 can also be controlled automatically, for example by receiving a command order corresponding to at least a signal from at least a sensor and/or a signal from a clock of the electronic control unit 15, in particular the microcontroller 31. The sensor and/or the clock can be integrated in the local command unit 12 or in the central command unit 13.

Advantageously, the electromechanical actuator 11 comprises a casing 17, in particular tubular. The electric motor 16 is mounted inside the casing 17, in particular in an assembled configuration of the electromechanical actuator 11.

Here, the casing 17 of the electromechanical actuator 11 is cylindrical in shape, in particular rotationally symmetrical around the axis of rotation X.

In an embodiment, the casing 17 is made of a metallic material.

The material of the casing of the electromechanical actuator is not limiting and can be different. In particular, it can be a plastic material.

The electromechanical actuator 11 further comprises an output shaft 20.

Advantageously, the electromechanical actuator 11 further comprises a gearbox 19.

Advantageously, the gearbox 19 comprises at least one reduction stage. The reduction stage can be an epicyclic gear train.

The type and the number of reduction stages of the gearbox are not limiting.

Advantageously, the electromechanical actuator 11 further comprises a brake 29.

By way of non-limiting examples, the brake 29 can be a spring brake, a cam brake, a magnetic brake or an electromagnetic brake.

Here and as seen in FIG. 3, in the assembled configuration of the electromechanical actuator 11, the brake 29 is configured to be disposed, in other words is disposed, between the electric motor 16 and the gearbox 19, that is to say at the output of the electric motor 16.

In a variant, not shown, in the assembled configuration of the electromechanical actuator 11, the brake 29 is configured to be disposed, in other words is disposed, between the electronic control unit 15 and the electric motor 16, in other words at the input of the electric motor 16, between the gearbox 19 and the output shaft 20, in other words at the output of the gearbox 19, or between two reduction stages of the gearbox 19.

Advantageously, the gearbox 19, and eventually, the brake 29 are arranged inside the casing 17 of the electromechanical actuator 11, in the assembled configuration of the electromechanical actuator 11.

Advantageously, the electromechanical actuator 11 can also comprise an obstacle and/or end-of-travel detection device, not shown, which can be mechanical or electronic.

The winding tube 4 is rotated around the axis of rotation X and the casing 17 of the electromechanical actuator 11 and is supported by two pivot connections. The first pivot connection is made at a first end of the winding tube 4 by means of a ring 30 inserted around a first end 17a of the casing 17 of the electromechanical actuator 11. The ring 30 thus allows to create a bearing. The second pivot connection, not shown in FIG. 3, is made at a second end of the winding tube 4, not visible in this figure.

Advantageously, the electromechanical actuator 11 further comprises a torque support 21, which can also be called the "actuator head". The torque support 21 is arranged at the first end 17a of the casing 17 of the electromechanical actuator 11, in the assembled configuration of the electromechanical actuator 11.

The torque support 21 ensures that the forces exerted by the electromechanical actuator 11, in particular the torque exerted by the electromechanical actuator 11, are taken up by the building structure. The torque support 21 can advantageously also take up forces exerted by the winding tube 4, especially the weight of the winding tube 4, of the electromechanical actuator 11 and of the screen 2, and ensure that these forces are taken up by the building structure.

Thus, the torque support 21 of the electromechanical actuator 11 allows the electromechanical actuator 11 to be fixed to a frame 23, in particular to a cheek of the box 9.

Advantageously, the torque support 21 protrudes from the first end 17a of the casing 17 of the electromechanical actuator 11, in particular the end 17a of the casing 17 receiving the ring 30. The ring 30 constitutes, in other words is configured to constitute, a bearing for the rotational guidance of the winding tube 4, in the assembled configuration of the shading device 3.

Advantageously, the torque support 21 of the electromechanical actuator 11 can also allow the first end 17a of the casing 17 to be closed off.

Moreover, the torque support 21 of the electromechanical actuator 11 can allow to support at least part of the electronic control unit 15.

Advantageously, the electronic control unit 15 can be supplied with electrical energy by means of a power supply cable 18.

Here and as illustrated in FIG. 3, the electronic control unit 15 is thus arranged, in other words integrated, inside the casing 17 of the electromechanical actuator 11.

In a variant, not shown, the electronic control unit 15 is arranged outside the casing 17 of the electromechanical actuator 11 and, in particular, mounted on the box 9 or in the torque support 21.

In the case where the electronic control unit 15 comprises a first electronic board and a second electronic board, not shown, the first electronic board of the electronic control unit 15 can be arranged inside the casing 17 of the electromechanical actuator 11. Furthermore, the second electronic board can be disposed within the torque support 21 of the electromechanical actuator 11. Moreover, the torque support 21 can comprise a cover, not shown. Furthermore, the second electronic board can be disposed within a recess formed between a part of the torque support 21 and the cover.

Advantageously, the torque support 21 can comprise at least a button, not shown.

Said button(s) can allow to carry out an adjustment of the electromechanical actuator 11 through one or more configuration modes, to pair with the electromechanical actuator 11 one or more command units 12, 13, to reset one or more parameters, which can be, for example, an end-of-travel position, to reset the paired command unit(s) 12, 13 or to control the movement of the screen 2.

Advantageously, the torque support 21 can comprise at least one display device, not shown, so as to provide a visual indication of an operating parameter of the motorised drive device 5.

Advantageously, the display device comprises at least a light source, not shown, in particular a light-emitting diode.

Said light source(s) are mounted on an electronic board of the electronic control unit 15 and, eventually, a transparent or translucent cover and/or a light guide, to allow the passage of the light emitted by the or each light source.

Advantageously, the output shaft 20 of the electromechanical actuator 11 is arranged inside the winding tube 4 and at least partly outside the casing 17 of the electromechanical actuator 11.

Here, one end of the output shaft 20 protrudes from the casing 17 of the electromechanical actuator 11, in particular from a second end 17b of the casing 17 opposite the first end 17a.

Advantageously, the output shaft 20 of the electromechanical actuator 11 is configured to rotate a connecting element 22. This connecting element 22 is connected to the winding tube 4, in the assembled configuration of the shading device 3. The connecting element is made in the form of a wheel.

When the electromechanical actuator 11 is switched on, the electric motor 16 and the gearbox 19 rotate the output shaft 20. Furthermore, the output shaft 20 of the electromechanical actuator 11 rotates the winding tube 4 via the connecting element 22.

Thus, the winding tube 4 rotates the screen 2 of the shading device 3, so that the opening 1 is opened or closed.

The shading device 3 and, more particularly, the motorised drive device 5 furthermore comprise an electrical energy supply device 26, visible in FIG. 2. The electromechanical actuator 11 is electrically connected to the electrical energy supply device 26.

The electrical energy supply device 26 comprises at least a battery 24. The electronic control unit 15 and the electric motor 16 and, more generally, the electromechanical actuator 11 are supplied, in other words configured to be supplied, with electrical energy by means of the battery 24.

The battery 24 is configured to provide, in other words provides, electrical energy to the electromechanical actuator 11, in particular to the electric motor 16 and the electronic control unit 15.

Advantageously, the battery 24 can be arranged in the box 9 of the shading device 3.

Here as shown in FIG. 2, the battery 24 is located outside the box 9.

In a variant, not shown, the battery 24 can be arranged inside the box 9, inside the winding tube 4 while still outside the casing 17, or inside the casing 17, in particular in the assembled configuration of the electromechanical actuator 11. In the latter case, the electromechanical actuator 11 comprises the battery 24.

When the torque support 21 comprises a display device, the operating parameter that this display device can display is advantageously a state of charge of the battery 24.

Here, the electromechanical actuator 11 comprises the power supply cable 18 allowing to for supplying it with electrical energy, especially the electrical energy supply of the electronic control unit 15 and the electrical energy supply of the electric motor 16, in particular from the battery 24.

Here and as illustrated in FIG. 3, the battery 24 is electrically connected directly to the electronic control unit 15, via the power supply cable 18.

The battery 24 is, preferably, of the rechargeable type.

The battery 24 comprises a plurality of energy storage elements 32. The energy storage elements 32 of the battery 24 can be, especially, rechargeable accumulators or cells.

Advantageously, the electrical energy supply device 26 further comprises at least an external electrical energy supply source 25, as illustrated in FIG. 2, in particular a photovoltaic panel.

Advantageously, the motorised drive device 5 and, in particular, the electronic control unit 15, comprises charging elements configured to charge the battery 24 from the electrical energy supplied by the external electrical energy supply source 25. In this case, the current flows between the components 15, 24 and 25 through a wire connection, not shown, which can be separate from the power supply cable 18.

Thus, the battery 24 is supplied with electrical energy, in other words is configured to be supplied with electrical energy, by means of the external electrical energy supply source 25, in particular by the photovoltaic panel.

Here and as illustrated in FIG. 2, the electronic control unit 15 comprises a single electronic board. Furthermore, the electronic board is configured to control the electric motor 16, to allow the recharging of the battery 24 and, eventually, to access functions for setting parameters and/or configuring the electromechanical actuator 11, by means of selection and, eventually, display elements, not shown. As mentioned above, the charging elements of the battery 24 can be arranged at the electronic board.

In a variant, not shown, the electronic control unit 15 comprises a first electronic board and a second electronic board. The first electronic board is configured to control, in other words controls, the electric motor 16. Furthermore, the second electronic board is configured to allow the recharging of the battery 24 and, eventually, to access functions for setting parameters and/or configuring the electromechanical actuator 11, by means of selection elements and, eventually, display elements, not shown. The charging elements of the battery 24 can be arranged on the second electronic board.

With reference to FIG. 4, an embodiment of a method for controlling the operation of the shading device 3, illustrated in FIGS. 1 to 3, according to the invention, is now described.

The method for controlling the operation of the shading device 3 comprises a step of executing E10 of a movement of the screen 2 by electrical activation of the electromechanical actuator 11.

Here, the movement of the screen 2 is initially executed at a nominal rotational speed setpoint Vn of the output shaft 20 of the electromechanical actuator 11.

The method for controlling the operation of the shading device 3 comprises at least the following steps, preferably executed in the order mentioned below:

determining E20 at least one value of data P representative of the operation of the motorised drive device 5 during the movement of the screen 2, during the step of executing E10, and comparing E30 the value of data P, determined during the step of determining E20, with respect to at least one value of a first predetermined threshold P_max.

Depending on the result, obtained during the step of comparing E30, the method comprises:

a step of reducing E40 the rotational speed setpoint V of the output shaft 20 of the electromechanical actuator 11 if the value of data P, determined during the step of determining E20, is equal to or exceeds the value of the first predetermined threshold P_max, in other words is greater than or equal to the value of the first predetermined threshold P_max, or a step of maintaining E50 the rotational speed setpoint V of the output shaft 20 of the electromechanical actuator 11 as long as the value of data P, determined during the step of determining E20, is strictly lower than the value of the first predetermined threshold P_max.

The step of reducing E40 allows to reduce, in other words to limit, the electrical power consumed by the electromechanical actuator 11, in particular by the electric motor 16, this electrical power coming from the battery 24. Furthermore, the step of maintaining E50 allows to maintain the electrical power consumed by the electromechanical actuator 11, in other words to preserve a same level of electrical power consumed by the electromechanical actuator 11, in particular by the electric motor 16, this electrical power coming from the battery 24.

Thus, the method allows the electromechanical actuator 11 to be optimally controlled depending on the speed of the output shaft 20, without exceeding a given power for each of the energy storage elements 32 of the battery 24.

In this way, the method allows to ensure a long life of the battery 24, to optimise sizing of the battery 24 and, more particularly, to optimise the number and the energy storage capacity of the energy storage elements 32 of the battery 24.

Furthermore, such a method can allow to minimise the noise of the motorised drive device 5 and, more particularly, of the shading device 3 during electrical activation of the electromechanical actuator 11.

Moreover, such a method allows to adapt automatically the operation of the electromechanical actuator 11 according to data P representative of the operation of the motorised drive device 5 during the movement of the screen 2 and, more particularly, its power consumed.

The method can thus allow to eliminate the need to learn, during one or more previous movements of the screen 2, the variation of data P representative of the operation of the motorised drive device 5. This avoids the need to determine a specific rotational speed setpoint V of the output shaft 20 of the electromechanical actuator 11, that specific setpoint being different from the nominal rotational speed setpoint Vn, at least during a start-up phase of the electromechanical actuator 11.

In the case where the value of data P, determined during the step of determining E20, is equal to or exceeds the value of the first predetermined threshold P_max, the rotational speed setpoint V of the output shaft 20 of the electromechanical actuator 11 is reduced, during the step of executing E10 a movement of the screen 2.

An adjustment of the rotational setpoint speed V of the output shaft 20 of the electromechanical actuator 11, in particular a reduction of this one, during the step of reducing E40, by determining the value of data P, allows to overcome environmental parameters external to the motorised drive device 5, such as, for example, ambient temperature or age of the shading device 3.

Advantageously, the execution of the step of reducing E40 the rotational speed setpoint V of the output shaft 20 of the electromechanical actuator 11 allows to prevent the value of data P exceeds, during a period of time of processing by the electronic control unit 15, in particular of executing steps E20 to E40, the value of the first predetermined threshold P_max.

As long as the value of data P, determined during the step of determining E20, is strictly lower than the value of the first predetermined threshold P_max, the rotational speed setpoint V of the output shaft 20 of the electromechanical actuator 11 is kept either at the nominal rotational speed setpoint Vn or at a current rotational speed setpoint V, during the step of executing E10.

Thus, the execution of the step of maintaining E50 allows to keep the nominal rotational speed setpoint Vn or a current rotational speed setpoint V, which can be defined following the execution of one or more iterations of the step of reducing E40.

Advantageously, the steps of determining E20, comparing E30, reducing E40 and maintaining E50 are implemented by the electronic control unit 15 and, more particularly, by the microcontroller 31.

The data P representative of the operation of the motorised drive device 5 is the power consumed by the electromechanical actuator 11 during the movement of the screen 2, during the step of executing E10. In this case, the value of the first predetermined threshold P_max is a value of a predetermined power threshold.

Advantageously, the method, in particular its steps E20, E30, E40 and E50, is implemented in the case of executing an upward movement of the screen 2, in particular between the second end-of-travel position FdCB, in other words the low or unwound end-of-travel position, and the first end-of-travel position FdCH, in other words the high or wound end-of-travel position.

Advantageously, the step of determining E20 is implemented between the second and first end-of-travel positions FdCB, FdCH.

Advantageously, the step of determining E20, the step of comparing E30 and the step of reducing E40 or the step of maintaining E50 are implemented iteratively according to a predetermined time period T.

As a non-limiting example, the predetermined time period T is of the order of five milliseconds.

In a variant, the step of determining E20 is implemented iteratively at defined times depending on the position of the rotor of the electric motor 16. The same is true with regard to the step of comparing E30 and the step of reducing E40 or the step of maintaining E50.

As a non-limiting example, the times when the step of determining is implemented can be dependent on a number of revolutions of the rotor of the electric motor 16 or a fraction of a revolution of the rotor of the electric motor 16.

Here, the electronic control unit 15 comprises at least one measuring device 37, 38. The measuring device 37, 38 is configured to measure, in other words measures, a quantity U_Batterie and/or I_Moteur representative of the operation of the motorised drive device 5.

In the case where data P representative of the operation of the motorised drive device 5 is the power consumed by the electromechanical actuator 11, the electronic control unit 15 comprises a first measuring device 37 and a second measuring device 38. The first measuring device 37 is configured to measure, in other words measures, a first quantity U_Batterie representative of the operation of the battery 24. The first quantity U_Batterie representative of the operation of the battery 24 is, for example, the output voltage of the battery 24. Furthermore, the second measuring device 38 is configured to measure, in other words measures, a second quantity I_Moteur representative of the operation of the electromechanical actuator 11. The second quantity I_Moteur representative of the operation of the electromechanical actuator 11 is, for example, the current consumed by the electric motor 16.

Advantageously, the power consumed by the electromechanical actuator 11 can be obtained, in particular, by the following formula:

$$P = DC \times U\_Batterie \times I\_Moteur$$

where DC corresponds to a duty cycle for controlling the electric motor 16,

U_Batterie corresponds to the output voltage of the battery 24, and

I_Moteur corresponds to the current consumed by the electric motor 16.

Advantageously, the electronic control unit 15, in particular the microcontroller 31, comprises at least one memory, not shown. The memory or memories of the electronic control unit 15 are configured to store one or more values of data P, determined during the step of determining E20. Furthermore, the memory or memories of the electronic control unit 15 are configured to store one or more values of the quantity or quantities U_Batterie, I_Moteur measured by the measuring device(s) 37, 38.

Advantageously, the step of determining E20 the value of data P comprises a first sub-step of measuring E201 at least one value of the first quantity U_Batterie and a second sub-step of measuring E202 at least one value of the second quantity I_Moteur.

Advantageously, the step of determining E20 the value of data P further comprises a first sub-step of storing E203 at least one measured value of the or each of the quantities U_Batterie, I_Moteur, during the first or second sub-step of measuring E201, E202, and a second sub-step of storing E204 at least one value of data P, determined during the step of determining E20.

Advantageously, the output voltage U_Batterie of the battery 24 is obtained by means of the first measuring device 37, which can be, for example, a resistive bridge. Furthermore, the current I_Moteur consumed by the electric motor 16 is obtained by means of the second measuring device 38, which can be, for example, a shunt resistor. Each of the values issued from the first measuring device 37 and the second measuring device 38 are converted from an analogue signal to a digital signal by means of an analogue/digital converter, not shown, and then processed by the microcontroller 31 of the electronic control unit 15.

Here, the analogue/digital converter is integrated in the microcontroller 31.

In a variant, not shown, the analogue/digital converter is a separate element from the microcontroller 31.

Advantageously, the current I_Moteur consumed by the electric motor 16 can be an instantaneous value, corresponding to a sample, or an average value, corresponding to an average of several samples, which can be stored, for example, in a memory of the microcontroller 31.

In a variant, the data representative of the operation of the motorised drive device 5 is the torque delivered by the electromechanical actuator 11 during the movement of the screen 2, during the step of executing E10. In this case, the value of the first predetermined threshold is a value of a predetermined torque threshold.

In the case where data P representative of the operation of the motorised drive device 5 is the torque delivered by the electromechanical actuator 11, the electronic control unit 15 comprises a single measuring device 38. The measuring device 38 is configured to measure a quantity I_Moteur representative of the operation of the electromechanical actuator 11. The quantity I_Moteur representative of the operation of the electromechanical actuator 11 is, for example, the current consumed by the electric motor 16. The measuring device 38 can be identical to the second measuring device described above, with reference to the case where data P representative of the operation of the motorised drive device 5 is the power consumed by the electromechanical actuator 11. In this case, it is considered that the torque delivered by the electromechanical actuator 11 is correlated, in particular proportional, to the current consumed by the electric motor 16.

The step of reducing E40 the rotational speed setpoint V of the output shaft 20 of the electromechanical actuator 11 can be implemented several times and, more particularly, each time the value of data P, determined during the step of determining E20, is equal to or exceeds the value of the first predetermined threshold P_max, during the implementation of the step of executing E10 a movement of the screen 2.

The step of determining E20, the step of comparing E30 and the step of reducing E40 the rotational speed setpoint V of the output shaft 20 of the electromechanical actuator 11 are implemented iteratively, as shown by the arrow of FIG. 4 connecting step E40 to step E20, until a value of a second predetermined threshold V_limitée is reached.

Thus, in the case where the value of data P, determined during the step of determining E20, is equal to or exceeds the value of the first predetermined threshold P_max, the rotational speed setpoint V of the output shaft 20 of the electromagnetic actuator 11 is reduced iteratively until the value of the second predetermined threshold V_limitée is reached, during the step of executing E10 a movement of the screen 2 by the electrical activation of the electromechanical actuator 11.

Here, the method allows to ensure a constant speed of movement of the screen 2, during a movement of this latter by the electrical activation of the electromechanical actuator 11, whatever the position of the screen 2 between the second and first end-of-travel positions FdCB, FdCH, in particular in the case of a roller shutter or a roller blind where the screen 2 is configured to roll up around the winding tube 4, during an upward movement of the screen 2 from the second end-of-travel position FdCB to the first end-of-travel position FdCH.

Here, the value of the second predetermined threshold V_limitée is a value of a predetermined speed threshold.

Advantageously, following the step of reducing E40, if the value of data P, determined during the step of determining E20, is lower than the value of the first predetermined threshold P_max, the rotational speed setpoint V of the output shaft 20 of the electromechanical actuator 11 is maintained at the value of the second predetermined threshold V_limitée.

Advantageously, the method further comprises a step of selecting E60 the value of the first predetermined threshold P_max among a plurality of values P_max1, P_max2, according to at least one condition C.

Advantageously, the condition C can be an operating condition of the battery 24, for example the age or the state of charge of its latter, or a climate condition, for example a temperature outside the building.

Advantageously, the step of selecting E60 is implemented based on a combination of conditions C, for example one or more operating conditions of the battery 24, as mentioned above, and a climate condition, as mentioned above.

Here, the value of the first predetermined threshold P_max is selected from two values P_max1, P_max2, a first value P_max1 called nominal and a second value P_max2 called degraded. Furthermore, the first value P_max1 is greater than the second value P_max2.

Advantageously, the step of selecting E60 is executed during the implementation of the step of executing E10 a movement of the screen 2 and, more particularly, at the start of the step of executing E10 a movement of the screen 2.

Advantageously, the step of selecting E60 is executed each time the step of executing E10 a movement of the screen 2 is implemented by the electrical activation of the electromechanical actuator 11.

Advantageously, the step of selecting E60 is implemented before the step of comparing E30.

Advantageously, the step of selecting E60 is implemented by the electronic control unit 15 and, more particularly, by the microcontroller 31 of the electronic control unit 15.

Advantageously, the step of selecting E60 comprises a sub-step of determining E601 at least one value of a quantity U_Batterie representative of the operation of the battery 24, in particular the output voltage of the battery 24, then a sub-step of comparing E602 the value of the quantity U_Batterie, determined during the sub-step of determining E601, with respect to at least one value of a third predetermined threshold U.

Here, the sub-step of determining E601 is equivalent to or corresponds to the first sub-step of measuring E201, that is to say the sub-step of determining E601 and the sub-step of measuring E201 can be implemented by the same sub-step for the steps of selecting E60 and determining E20. The value of the quantity U_Batterie is determined by the first measuring device 37. Furthermore, the value of the third predetermined threshold is a value of a predetermined voltage threshold.

Advantageously, the sub-step of comparing E602 is implemented throughout the movement of the screen 2, during the step of executing E10.

Advantageously, a movement of the screen 2, during the step of executing E10, is implemented initially using the first value P_max1 of the first predetermined threshold P_max and then, depending on the result of the sub-step of comparing E602, using the second value P_max2 of the first predetermined threshold P_max if the value of the quantity U_Batterie, determined during the sub-step of determining E601, is strictly lower than the value of the third predetermined threshold U, or by maintaining the value P_max1 of the first predetermined threshold P_max if the value of the quantity U_Batterie, determined during the sub-step of determining E601, is greater than or equal to the value of the third predetermined threshold U.

In a variant, not shown, upon reaching the value of the second predetermined speed threshold V_limitée, the method implements a step of increasing the rotational speed setpoint V of the output shaft 20 of the electromechanical actuator 11, in particular until the nominal rotational speed setpoint Vn is reached.

Such a step of increasing can be implemented, especially, in the case where the noise generated by the electrical activation of the electromechanical actuator 11 and/or the variation of the rotational speed setpoint V of the output shaft 20 of the electromechanical actuator 11 are not perceptible by the user or are not annoying to this latter.

In a variant, not shown, in the case where data P, determined during the step of determining E20, is equal to or exceeds the value of the first predetermined threshold P_max, during a movement of the screen 2, implemented during the step of executing E10, the method implements a step of modifying the rotational speed setpoint V of the output shaft 20 of the electromechanical actuator 11, so as to adapt the value of the rotational speed setpoint V of the output shaft 20 of the electromechanical actuator 11 during a subsequent movement of the screen 2, implemented during a new step of executing E10.

Thus, a modified rotational speed setpoint Vm of the output shaft 20 of the electromechanical actuator 11 is lower or higher than an initial rotational speed setpoint VO of the output shaft 20 of the electromechanical actuator 11, during implementing the subsequent movement of the screen 2.

In this way, the modification of the rotational speed setpoint V of the output shaft 20 of the electromechanical actuator 11 for a subsequent movement of the screen 2, during executing a new step of executing E10, allows to minimise, or even to eliminate, a perception of variation in the rotational speed of the output shaft 20 of the electromechanical actuator 11, during implementing the subsequent movement of the screen 2.

Advantageously, the modified rotational speed setpoint Vm of the output shaft 20 of the electromechanical actuator 11 is determined depending on the minimum rotational speed of the output shaft 20 of the electromechanical actuator 11, which is reached when the movement of the screen 2 is implemented, and, eventually, of a determined period of time during which the rotational speed of the output shaft 20 of the electromechanical actuator 11 was less than the rotational speed setpoint V of the output shaft 20 of the electromechanical actuator 11, during implementing the movement of the screen 2.

In a variant, not shown, during a movement of the screen 2, between the second end-of-travel position FdCB and the first end-of-travel position FdCH, implemented during a first step of executing E10, the method implements a step of determining a highest value of data P reached.

This determined highest value of data P is intended to be used during a subsequent movement of the screen 2, implemented during a subsequent step of executing E10, as being the value of the first predetermined threshold P_max.

In this variant, the step of determining E20 is hereinafter referred to as the first step of determining. Furthermore, the step of determining the highest value of data P reached is hereinafter referred to as the second step of determining.

Advantageously, the method comprises a first step of recording the highest value of data P, determined during the second step of determining, in particular in a memory of the microcontroller 31 of the electronic control unit 15.

The method comprises a third step of determining a specific position of the screen 2, between the second end-of-travel position FdCB and the first end-of-travel position FdCH, for which the highest value of data P is determined, during the second step of determining.

Advantageously, the third step of determining the specific position of the screen 2 is implemented by means of a counting device, not shown. Furthermore, the counting device is configured to cooperate, in other words cooperates, with the electronic control unit 15.

Advantageously, the counting device comprises at least one sensor, in particular a position sensor.

The number of sensors of the counting device is not limiting and can be equal to one, two or more.

In an embodiment, the counting device is of the magnetic type, for example an encoder equipped with one or more Hall sensors. Moreover, the counting device is configured to determine, in other words determines, an angular position and/or a number of revolutions made, from a reference position, of the rotor of the electric motor 16.

In a variant, not shown, the counting device is configured to determine, in other words determines, an angular position and/or a number of revolutions made, from a reference position, of the output shaft 20 of the electromechanical actuator 11.

The type of counting device is not limiting and can be different. This counting device can, in particular, be of the optical type, for example an encoder equipped with one or more optical sensors, or of the temporal type, for example a clock of the microcontroller 31.

Here, the counting device is configured to determine, in other words determines, a current position of the screen 2 and/or whether the screen 2 has reached either the high end-of-travel position FdCH or the low end-of-travel position FdCB.

Advantageously, the method comprises a second step of recording the specific position corresponding to the highest value of data P, determined during the third step of determining, in particular in a memory of the microcontroller 31 of the electronic control unit 15.

The method comprises a fourth step of determining an acceleration ramp of the rotational speed setpoint V of the output shaft 20 of the electromechanical actuator 11, from the second end-of-travel position FdCB to the specific position corresponding to the highest value of data P.

The acceleration ramp is determined, during the fourth step of determining, so that the nominal rotational speed setpoint Vn of the output shaft 20 of the electromechanical actuator 11 is reached at the time when the screen 2 reaches the specific position corresponding to the highest value of data P, determined during the third step of determining, during a subsequent movement of the screen 2, implemented during a subsequent step of executing E10.

In a subsequent step of executing E10, the movement of the screen 2 is implemented following the acceleration ramp, determined during the fourth step of determining.

Thus, the highest value of data P reached is determined when an upward movement of the screen 2 is implemented and the acceleration ramp of the rotational speed setpoint V of the output shaft 20 of the electromechanical actuator 11 is calculated depending on the characteristics of the shading device 3.

In this way, an abrupt change in the speed of movement of the screen 2 is less perceptible to the user, during implementing the subsequent step of executing E10, in the case where the step of reducing E40 is executed, that is to say when the position corresponding to the highest value of data P is passed.

In a variant, not shown, the method comprises, during the step of executing E10, which can be the first step of executing considered above, one or each of the subsequent steps of executing, a step of measuring at least one value of the output voltage U_Batterie of the battery 24, in particular during the implementation of the acceleration ramp, determined during the fourth step of determining.

Here, the step of measuring is implemented by means of the first measuring device 37.

Furthermore, the method comprises a step of comparing the value of the output voltage U_Batterie measured, during the step of measuring, with respect to a value of a fourth predetermined threshold U_min.

In this variant, the step of comparing E30 corresponds to a first step of comparing. Furthermore, the step of comparing the value of the measured output voltage U_Batterie is hereinafter referred to as the second step of comparing.

Advantageously, the second step of comparing is implemented throughout the movement of the screen 2, during the step of executing E10.

Depending on the result, obtained in the second step of comparing, the method implements a step of modifying the value of the first predetermined threshold P_max if the value of the output voltage U_Batterie, measured during the step of measuring, is strictly lower than the value of the fourth predetermined threshold U_min, or a step of maintaining the value of the first predetermined threshold P_max as long as the value of the output voltage U_Batterie, measured during the step of measuring, is greater than or equal to the value of the fourth predetermined threshold U_min.

Advantageously, the second, third and fourth steps of determining, the step of measuring and the second step of comparing are implemented by the electronic control unit 15 and, more particularly, by the microcontroller 31.

Thanks to the present invention, regardless of the embodiment, the method allows the electromechanical actuator to be optimally controlled depending on the speed of the output shaft, without exceeding a given power for each of the energy storage elements of the battery intended to supply electrical energy to the electric motor of the electromechanical actuator and the electronic control unit of the motorised drive device.

In this way, the method allows to ensure a long life of the battery, to optimise sizing of the battery and, more particularly, to optimise the number and the energy storage capacity of the energy storage elements of the battery.

Furthermore, such a method can allow to minimise the noise of the motorised drive device and, more particularly, of the shading device during electrical activation of the electromechanical actuator.

Moreover, such a method allows to adapt automatically the operation of the electromechanical actuator according to data representative of the operation of the motorised drive device during the movement of the screen and, more particularly, its power consumed.

The method can thus allow to eliminate the need to learn, during one or more previous movements of the screen, the variation of data representative of the operation of the motorised drive device. This avoids the need to determine a specific rotational speed setpoint of the output shaft of the electromechanical actuator, that specific setpoint being different from the nominal rotational speed setpoint, at least during a start-up phase of the electromechanical actuator.

Numerous modifications can be made to the above-described embodiments, without departing from the scope of the invention defined by the attached claims.

In a variant, not shown, the electrical energy supply device 26 further comprises a charger. This charger is configured to be connected, in other words is connected, to a wall socket, so as to recharge the battery 24 from a mains electrical energy supply network. This charger forms the external electrical energy supply source 25 or an additional external electrical energy supply source.

In a variant, not shown, the external electrical energy supply source 25 is an auxiliary battery, provided to recharge the battery 24. Thus, the battery 24 can be recharged by means of the auxiliary battery forming the external electrical energy supply source 25, particularly in the case where the shading device 3 is remote from a wall socket. Furthermore, the auxiliary battery forming the external electrical energy supply source can allow to recharge a battery of other electrical equipment, in particular mobile equipment, such as, for example, a mobile phone or a mobile computer. Moreover, such an auxiliary battery, forming the external electrical energy supply source 25, can have at least two electrical outputs, in particular a first output delivering a voltage of 12 volts to supply electrical energy to the battery 24 and a second output delivering a voltage of 5 volts to supply electrical energy to other electrical equipment, known as mobile equipment.

In a variant, not shown, the electromechanical actuator 11 is inserted in a rail, in particular of square or rectangular cross-section, which can be opened at one or both ends, in the assembled configuration of the shading device 3. Moreover, the electromechanical actuator 11 can be configured to drive a drive shaft on which cords for moving and/or orienting the screen 2 are wound.

In a variant, the electric motor 16 of the electromechanical actuator 11 can be of the asynchronous or direct current type.

Furthermore, the proposed embodiments and variants can be combined to generate new embodiments of the invention, without departing from the scope of the invention defined by the attached claims.

The invention claimed is:

1. A method for controlling the operation of a shading device,
the shading device comprising at least:
a screen, and
a motorized drive device,
the motorized drive device comprising at least:
an electromechanical actuator, the electromechanical actuator being configured to move the screen, between a first end-of-travel position and a second end-of-travel position, and vice versa,
an electronic control unit, and
an electrical energy supply device,
the electromechanical actuator comprising at least:
an electric motor, and
an output shaft,
the electrical energy supply device comprising at least:
a battery, the battery comprising a plurality of energy storage elements, the electronic control unit and the electric motor being supplied with electrical energy by means of the battery,
the electronic control unit comprising at least:
a measuring device, the measuring device being configured to measure a quantity representative of the operation of the motorized drive device,
wherein the method comprises at least the following steps:
executing a movement of the screen by electrical activation of the electromechanical actuator,
determining at least one value of data, by means of the measuring device, representative of the operation of the motorized drive device during the movement of the screen, during the step of executing, the data being the power consumed by the electromechanical actuator or the torque delivered by the electromechanical actuator during the movement of the screen, during the step of executing,
comparing the value of data, determined during the step of determining, with respect to at least one value of a first predetermined threshold,
depending on the result, obtained during the step of comparing, reducing a rotational speed setpoint of the output shaft of the electromechanical actuator if the value of data, determined during the step of determining, is equal to or exceeds the value of the first predetermined threshold, so as to reduce the electric power consumed by the electromechanical actuator from the battery and to prevent exceeding the value of the first predetermined threshold during a period of time of processing by the electronic control unit, or maintaining the rotational speed setpoint of the output shaft of the electromechanical actuator as long as the value of data, determined during the step of determining, is lower than the value of the first predetermined threshold, wherein the step of determining, the step of comparing and the step of reducing the rotational speed setpoint of the output shaft of the electromechanical actuator are implemented iteratively until a value of a second predetermined threshold is reached, wherein the value of the second predetermined threshold is a value of a predetermined speed threshold, and wherein the electromechanical actuator is controlled depending on the speed of the output shaft, without exceeding a given limited power for each of the energy storage elements of the battery intended to supply electrical energy to the electric motor of the electromechanical actuator and the electronic control unit of the motorized drive device.

2. The method for controlling the operation of a shading device according to claim 1, wherein the step of determining, the step of comparing and one of the step of reducing and the step of maintaining are implemented iteratively according to a predetermined time period.

3. The method for controlling the operation of a shading device according to claim 1, wherein, following the step of reducing, if the value of data, determined during the step of determining, is less than the value of the first predetermined threshold, the rotational speed setpoint of the output shaft of the electromechanical actuator is maintained at the value of the second predetermined threshold.

4. The method for controlling the operation of a shading device according to claim 1, wherein, upon reaching the value of the second predetermined speed threshold, the method implements a step of increasing the rotational speed setpoint of the output shaft of the electromechanical actuator.

5. The method for controlling the operation of a shading device according to claim 1, wherein, in the case where the data, determined during the step of determining, is equal to or exceeds the value of the first predetermined threshold, during a movement of the screen, implemented during the step of executing, the method implements a step of modifying the rotational speed setpoint of the output shaft of the electromechanical actuator, so as to adapt the value of the rotational speed setpoint of the output shaft of the electromechanical actuator during a subsequent movement of the screen, implemented during a new step of executing.

6. The method for controlling the operation of a shading device according to claim 1, wherein the method further comprises a step of selecting the value of the first predetermined threshold from a plurality of values, depending on at least one condition.

7. The method for controlling the operation of a shading device according to claim 1, wherein the method is implemented in the case of executing an upward movement of the screen.

8. A shading device comprising at least:
a screen, and
a motorized drive device,
the motorized drive device comprising at least:
an electromechanical actuator, the electromechanical actuator being configured to move the screen, between a first end-of-travel position and a second end-of-travel position, and vice versa,
an electronic control unit, and
an electrical energy supply device,
the electromechanical actuator comprising at least:
an electric motor, and
an output shaft,
the electrical energy supply device comprising at least:
a battery, the battery comprising a plurality of energy storage elements, the electronic control unit and the electric motor being supplied with electrical energy by means of the battery,
wherein the electronic control unit is configured to implement the method according to claim 1.

9. The shading device according to claim 8, wherein:
the electrical energy supply device further comprises at least a photovoltaic panel,
and the battery is supplied with electrical energy by means of the photovoltaic panel.

10. The shading device according to claim 8, wherein the shading device further comprises a winding tube,
the screen can be rolled onto the winding tube,
and the winding tube is arranged to be rotated by the electromechanical actuator.

11. A method for controlling the operation of a shading device,
the shading device comprising at least:
a screen, and
a motorized drive device,
the motorized drive device comprising at least:
an electromechanical actuator, the electromechanical actuator being configured to move the screen, between a first end-of-travel position and a second end-of-travel position, and vice versa,
an electronic control unit, and
an electrical energy supply device,
the electromechanical actuator comprising at least:
an electric motor, and
an output shaft,
the electrical energy supply device comprising at least:
a battery, the battery comprising a plurality of energy storage elements, the electronic control unit and the electric motor being supplied with electrical energy by means of the battery,
the electronic control unit comprising at least:
a measuring device, the measuring device being configured to measure a quantity representative of the operation of the motorized drive device,
wherein the method comprises at least the following steps:
executing a movement of the screen by electrical activation of the electromechanical actuator,
determining at least one value of data, by means of the measuring device, representative of the operation of the motorized drive device during the movement of the screen, during the step of executing, the data being the power consumed by the electromechanical actuator or the torque delivered by the electromechanical actuator during the movement of the screen, during the step of executing, comparing the value of data, determined during the step of determining, with respect to at least one value of a first predetermined threshold, depending on the result, obtained during the step of comparing, reducing a rotational speed setpoint of the output shaft of the electromechanical actuator if the value of data, determined during the step of determining, is equal to or exceeds the value of the first predetermined threshold, so as to reduce the electric power consumed by the electromechanical actuator from the battery and to prevent exceeding the value of the first predetermined threshold during a period of time of processing by the electronic control unit, or maintaining the rotational speed setpoint of the output shaft of the electromechanical actuator either at the nominal rotational speed setpoint or at a current rotational speed setpoint, as long as the value of data, determined during the step of determining, is strictly lower than the value of the first predetermined threshold, wherein the step of determining, the step of comparing and the step of reducing the rotational speed setpoint of the output shaft of the electromechanical actuator are implemented iteratively until a value of a second predetermined threshold is reached, wherein the value of the second predetermined threshold is a value of a predetermined speed threshold, and wherein the electromechanical actuator is controlled depending on the speed of the output shaft, without exceeding a given limited power for each of the energy storage elements of the battery intended to supply electrical energy to the electric motor of the electromechanical actuator and the electronic control unit of the motorized drive device.

12. The method for controlling the operation of a shading device according to claim 11, wherein the step of determining, the step of comparing and one of the step of reducing and the step of maintaining are implemented iteratively according to a predetermined time period.

13. The method for controlling the operation of a shading device according to claim 11, wherein, upon reaching the value of the second predetermined speed threshold, the method implements a step of increasing the rotational speed setpoint of the output shaft of the electromechanical actuator.

14. The method for controlling the operation of a shading device according to claim 11, wherein, in the case where the data, determined during the step of determining, is equal to or exceeds the value of the first predetermined threshold, during a movement of the screen, implemented during the step of executing, the method implements a step of modifying the rotational speed setpoint of the output shaft of the electromechanical actuator, so as to adapt the value of the rotational speed setpoint of the output shaft of the electromechanical actuator during a subsequent movement of the screen, implemented during a new step of executing.

15. The method for controlling the operation of a shading device according to claim 11, wherein the method further comprises a step of selecting the value of the first predetermined threshold from a plurality of values, depending on at least one condition.

16. The method for controlling the operation of a shading device according to claim 11, wherein the method is implemented in the case of executing an upward movement of the screen.

17. A method for controlling the operation of a shading device, the shading device comprising at least:
    a screen, and
    a motorized drive device, the motorized drive device comprising at least:
    an electromechanical actuator, the electromechanical actuator being configured to move the screen, between a first end-of-travel position and a second end-of-travel position, and vice versa,
    an electronic control unit, and
    an electrical energy supply device, the electromechanical actuator comprising at least:
    an electric motor, and
    an output shaft, the electrical energy supply device comprising at least:
    a battery, the battery comprising a plurality of energy storage elements, the electronic control unit and the electric motor being supplied with electrical energy by means of the battery, the electronic control unit comprising at least:
    a measuring device, the measuring device being configured to measure a quantity representative of the operation of the motorized drive device, wherein the method comprises at least the following steps:

executing a movement of the screen by electrical activation of the electromechanical actuator, determining at least one value of data, by means of the measuring device, representative of the operation of the motorized drive device during the movement of the screen, during the step of executing, the data being the power consumed by the electromechanical actuator or the torque delivered by the electromechanical actuator during the movement of the screen, during the step of executing, comparing the value of data, determined during the step of determining, with respect to at least one value of a first predetermined threshold, depending on the result, obtained during the step of comparing, reducing a rotational speed setpoint of the output shaft of the electromechanical actuator if the value of data, determined during the step of determining, is equal to or exceeds the value of the first predetermined threshold, so as to reduce the electric power consumed by the electromechanical actuator from the battery and to prevent exceeding the value of the first predetermined threshold during a period of time of processing by the electronic control unit, or maintaining the rotational speed setpoint of the output shaft of the electromechanical actuator either at the nominal rotational speed setpoint or at a current rotational speed setpoint, as long as the value of data, determined during the step of determining, is strictly lower than the value of the first predetermined threshold, wherein the step of determining, the step of comparing and the step of reducing the rotational speed setpoint of the output shaft of the electromechanical actuator are implemented iteratively until a value of a second predetermined threshold is reached, wherein the value of the second predetermined threshold is a value of a predetermined speed threshold, wherein, following the step of reducing the rotational speed setpoint of the output shaft of the electromechanical actuator, if the value of data, determined during the step of determining, is less than the value of the first predetermined threshold, the rotational speed setpoint of the output shaft of the electromechanical actuator is maintained at the value of the second predetermined threshold, and wherein the electromechanical actuator is controlled depending on the speed of the output shaft, without exceeding a given limited power for each of the energy storage elements of the battery intended to supply electrical energy to the electric motor of the electromechanical actuator and the electronic control unit of the motorized drive device.

18. The method for controlling the operation of a shading device according to claim 17, wherein the step of determining, the step of comparing and one of the step of reducing and the step of maintaining are implemented iteratively according to a predetermined time period.

19. The method for controlling the operation of a shading device according to claim 17, wherein the method further comprises a step of selecting the value of the first predetermined threshold from a plurality of values, depending on at least one condition.

20. The method for controlling the operation of a shading device according to claim 17, wherein the method is implemented in the case of executing an upward movement of the screen.

* * * * *